Oct. 18, 1932.   B. T. BORDEN   1,883,334
DIESTOCK
Filed Aug. 16, 1930
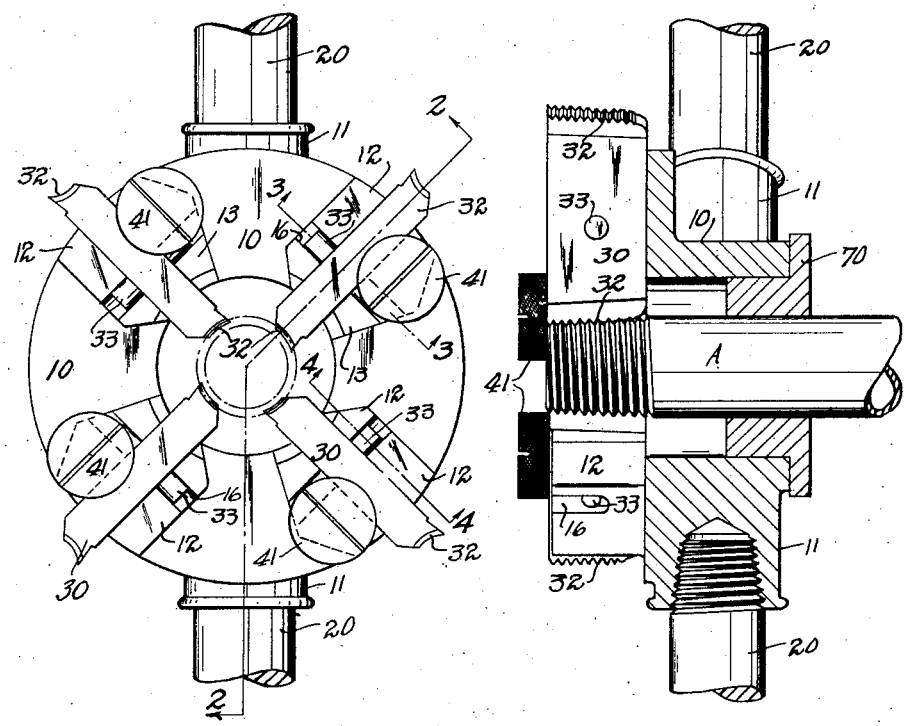
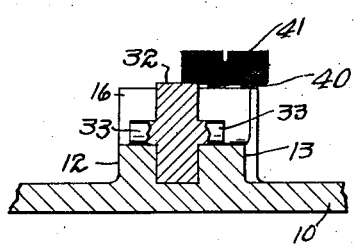
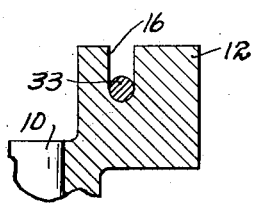
FIG.1   FIG.2   FIG.3   FIG.4
Inventor
Bradford T. Borden
By Bates, Goldrick & Teare
Attorney Patented Oct. 18, 1932

1,883,334

UNITED STATES PATENT OFFICE

BRADFORD T. BORDEN, OF LAKEWOOD, OHIO, ASSIGNOR OF ONE-HALF TO WILLIAM A. NERACHER, OF WARREN, OHIO, AND ONE-HALF TO THE BORDEN COMPANY, OF WARREN, OHIO, A CORPORATION OF OHIO

DIESTOCK

Application filed August 16, 1930. Serial No. 475,782.

This invention relates to a die stock of the type wherein the chasers remain in fixed position during the thread cutting operation. One of the objects of the invention is to provide such a tool in a form which will accurately position the chasers in either of a plurality of settings to enable the die stock to cut different sizes of pipe. Another object is to provide very simple means for clamping the chasers in such selected position, effectively holding them while in use but enabling them to be quickly and easily freed for repositioning.

My tool is adapted for carrying chasers with cutting teeth on both ends, so that by reversing the chasers the number of sizes which may be cut is doubled.

My invention is illustrated in the drawings hereof, is hereinafter more fully explained, and its essential novel features are summarized in the claims.

In the drawings, Fig. 1 is a face view of a die stock made in accordance with my invention; Fig. 2 is an axial section thereof in two radial planes indicated by the line 2—2 of Fig. 1; Figs. 3 and 4 are details in cross section through the chaser housing, as indicated by the correspondingly numbered lines on Fig. 1.

The frame of my die stock comprises a suitable hollow member 10, which may be a single integral casting, carrying the thread-cutting chasers 32 adjacent one end and a suitable pipe guide adjacent the other. Intermediately, means are provided for rotating the frame. I have shown for this purpose the frame equipped with two diametrically opposite sockets 11 into which suitable handles 20 may extend, though any other means may be provided for rotating the frame.

On one side of its intermediate region, the frame is provided with a number of equidistant housings for the chasers, each housing comprising a pair of parallel bosses or walls 12 and 13 leaving a parallel-sided recess between them.

Each recess is adapted to be occupied by a parallel-sided chaser 30. On opposite sides, the chaser is slidably guided by the bosses 12 and 13, while the inner face of the chaser rests upon the frame 10 at the bottom of the housing, which in this region lies in a single plane. A suitable clamping device serves to hold the chaser down against the frame.

To position the chaser positively so that it may not move either in or out, I provide one or more pins on the chaser projecting laterally and engaging open ends of notches formed in the side walls of the guides. Preferably, I form the pins, designated 33, on opposite sides of the chaser 30. These pins occupy vertical notches 16 formed in the bosses 12 and 13 which make the side walls of the chaser housing. These notches have open ends. Accordingly, when the chaser is dropped into place, its pins pass into the notches and the chaser accordingly cannot move lengthwise, by reason of the pins, or laterally, by reason of the guide walls; and hence, it is firmly fixed as soon as it is clamped against the bottom of its guide.

I may clamp the chasers in place by means of the overhanging heads 41 of screws 40 threaded into the bosses 13. This makes a very simple and effective clamping. The chaser preferably extends slightly above the housing, as shown in Fig. 3, so that the screw heads bear directly on the chaser and thus clamp it tightly in place. The loosening of the screw sufficiently for the chaser pin to clear the notch, enables the removal of the chaser for reversal, repair or cleaning, as desired.

When the die stock is changed for different sizes of pipe, a corresponding change is made in some suitable pipe guide carried by the frame 10. I have illustrated for this purpose one of a number of interchangeable bushings 70 occupying the bore of the die stock, and adapted to be clamped by a set screw (not shown), and thus position a pipe A of size corresponding to the setting of the chasers.

My die stock is admirably adapted for carrying double-ended chasers. The pins 33, on opposite sides of the chasers, are in alignment with each other; and hence either pin may occupy either notch, enabling the chaser to be turned end for end, as desired. By locating the pins nearer one end of the chaser than the other, the distance of the active teeth 32 from the axis is accordingly varied by this simple act of reversing the chaser. Whichever end of the chaser is active, the thrust is effectively received by the distant wall of the notches occupied by the pins.

It will be seen that the chaser is held in a definite position by reason of a pin on the chaser snugly engaging an opening in the solid integral frame of the die stock. This enables a very accurate positioning of the chasers. The clamping of the chasers in place is made very simply and effectively. This tool is simple to construct and requires a comparatively small amount of machining.

I claim:

1. In a die stock, the combination of a frame having chaser guides each in the form of a pair of walls spaced apart to leave a comparatively deep, narrow, parallel-sided, radial passageway between them, notches in the walls on opposite sides of the passageway, and narrow chasers adapted to stand on one of their narrow edges in the guides and having pins projecting laterally from their opposite wide faces, said pins occupying said notches.

2. In a die stock, the combination of an annular frame having radial chaser guideways open at both ends, outwardly facing notches in the frame on opposite sides of the chaser guiding space and perpendicular thereto, and chasers adapted to occupy the guides and having rigid pins projecting from their opposite sides, said pins occupying the notches, and means bearing on the outer edge of the chasers to hold against the bottom of guiding space, the outer walls of the notches receiving the radial thrust on the chasers.

3. In a die stock, the combination of a frame having radial chaser guides provided with walls parallel to each other on their adjacent faces, notches formed in the two walls directly opposite each other and normal to the guiding space, and chasers with cutting teeth on each end adapted to occupy the guide faced in either direction, each chaser having pins projecting from each of its flat sides and directly opposite each other, either pin being adapted to occupy either notch, according to which way the chaser is facing, and the pins being nearer one end of the chaser than the other.

4. In a die stock, the combination of a frame having radial chaser guides formed by walls on opposite sides of radial planes, a notch in one of such walls of each guide at the side of the guiding space, each notch being open at the end which is at the top of the wall, and chasers having pins projecting from their sides and occupying the notches, and means for clamping the chasers against the frame.

In testimony whereof, I hereunto affix my signature.

BRADFORD T. BORDEN.